(12) United States Patent
Forsthoevel et al.

(10) Patent No.: US 9,370,874 B2
(45) Date of Patent: Jun. 21, 2016

(54) METHOD AND TEMPERING DEVICE FOR HEATING PREFORMS PRIOR TO MOLDING THE SAME TO FORM CONTAINERS

(75) Inventors: Jochen Forsthoevel, Regensburg (DE); Ulrich Lappe, Regensburg (DE); Jochen Hirdina, Regensburg (DE); Peter Knapp, Schmatzhausen (DE); Konrad Senn, Regensburg (DE); Gerald Huettner, Vilseck (DE)

(73) Assignee: Krones AG, Neutraubling (DE)

( * ) Notice: Subject to any disclaimer, the term of this patent is extended or adjusted under 35 U.S.C. 154(b) by 370 days.

(21) Appl. No.: 12/800,614

(22) Filed: May 19, 2010

(65) Prior Publication Data
US 2010/0295217 A1 Nov. 25, 2010

(30) Foreign Application Priority Data

May 19, 2009 (DE) .......................... 10 2009 025 839

(51) Int. Cl.
*B29C 49/64* (2006.01)
*B29B 13/02* (2006.01)
(Continued)

(52) U.S. Cl.
CPC ............ *B29B 13/025* (2013.01); *B29C 49/6445* (2013.01); *B29C 35/045* (2013.01); *B29C 49/06* (2013.01); *B29C 49/12* (2013.01); *B29C 49/78* (2013.01); *B29C 2035/0822* (2013.01); *B29C 2035/0838* (2013.01); *B29C 2035/0861* (2013.01); *B29K 2067/00* (2013.01)

(58) Field of Classification Search
CPC B29B 13/025; B29B 13/08; B29B 2013/027; B29B 2911/1402; B29C 49/6445; B29C 49/6454; B29C 49/6436; B29C 49/68; B29C 49/6409; B29C 49/786; B29C 2049/64

USPC .......................................... 264/454, 457, 458
See application file for complete search history.

(56) References Cited

U.S. PATENT DOCUMENTS 3,830,893 A * 8/1974 Steingisler .................... 264/489
3,846,522 A * 11/1974 Goldman ...................... 264/489
(Continued)

FOREIGN PATENT DOCUMENTS

CN 1181726 5/1998
CN 1807066 7/2006
(Continued)

OTHER PUBLICATIONS http://en.wikipedia.org/wiki/Infrared.*

*Primary Examiner* — Timothy Kennedy
(74) *Attorney, Agent, or Firm* — Davidson, Davidson & Kappel, LLC

(57) ABSTRACT

The invention discloses a method of heating a preform (50) of thermoplastic material prior to blow molding the same to form a container, with the preform (50) being held at a threaded region (58) during heating thereof. A neck portion (48) of the preform (50) close to the threaded region (58) is temporarily heated more strongly as compared to other regions. The invention further relates to a tempering device for heating such a preform (50), including at least one radiation and/or heat source acting on the preform (50) and defining several impact regions on the preform (50) with different heating intensities each. The preform (50) has associated therewith at least one reflector (52) disposed in the threaded (58) and/or neck region (48) for deflecting radiation proportions piercing the neck region (48) and for heating the neck region (48) on an inside of the preform (50).

23 Claims, 5 Drawing Sheets

(51) Int. Cl.

| | | |
|---|---|---|
| B29C 35/04 | (2006.01) | |
| B29C 49/06 | (2006.01) | |
| B29C 49/12 | (2006.01) | |
| B29C 49/78 | (2006.01) | |
| B29C 35/08 | (2006.01) | |
| B29K 67/00 | (2006.01) | |

(56) References Cited

U.S. PATENT DOCUMENTS

| | | | | |
|---|---|---|---|---|
| 3,865,531 A | * | 2/1975 | Moore et al. | 425/525 |
| 3,975,618 A | * | 8/1976 | Goos et al. | 264/492 |
| 4,025,594 A | * | 5/1977 | Agrawal | 264/521 |
| 4,046,498 A | * | 9/1977 | Appel et al. | 425/526 |
| 4,092,097 A | * | 5/1978 | Appel et al. | 432/11 |
| 4,147,487 A | * | 4/1979 | Dickson et al. | 425/174.4 |
| 4,288,478 A | * | 9/1981 | Kinoshita et al. | 428/36.92 |
| 4,342,895 A | * | 8/1982 | Krishnakumar et al. | 219/770 |
| 4,375,442 A | * | 3/1983 | Ota et al. | 264/458 |
| 5,011,648 A | | 4/1991 | Garver et al. | |
| 5,180,893 A | * | 1/1993 | Sugiyama et al. | 219/657 |
| 5,920,677 A | | 7/1999 | Emmer et al. | 392/419 |
| 6,005,223 A | | 12/1999 | Ogihara | |
| 6,241,938 B1 | | 6/2001 | Barel et al. | |
| 6,287,507 B1 | | 9/2001 | Appel et al. | |
| 6,361,301 B1 | * | 3/2002 | Scaglotti et al. | 425/174.4 |
| 6,979,420 B2 | * | 12/2005 | Weber | 264/521 |
| 7,284,778 B1 | | 10/2007 | Pellegatta | |
| 7,448,866 B2 | * | 11/2008 | Doudement | 425/174.4 |
| 2008/0166440 A1 | | 7/2008 | Dujardin et al. | |
| 2009/0230124 A1 | | 9/2009 | Senn | |
| 2010/0052224 A1 | | 3/2010 | Humele et al. | |

FOREIGN PATENT DOCUMENTS

| | | | | |
|---|---|---|---|---|
| DE | 41 07 011 A1 | | 9/1992 | |
| DE | 196 08 570 A1 | | 9/1997 | |
| DE | 696 01 913 T2 | | 8/1999 | |
| DE | 695 25 985 T2 | | 11/2002 | |
| DE | 696 23 606 T2 | | 5/2003 | |
| DE | 10 2005 061334 A1 | | 6/2007 | |
| DE | 20 2008 005 252 U1 | | 7/2008 | |
| DE | 10 2007 016 028 A1 | | 10/2008 | |
| DE | 10 2008 014 215 A1 | | 9/2009 | |
| EP | 1529621 | | 5/2005 | |
| FR | 2 789 932 | | 8/2000 | |
| GB | 2095611 A | * | 10/1982 | B29B 3/00 |
| JP | 2008 000 972 A | | 1/2008 | |
| JP | 2008-972 | | 1/2008 | |
| WO | WO92/15442 | | 9/1992 | |
| WO | WO 96/08356 | | 3/1996 | |
| WO | WO 2006/047260 A1 | | 5/2006 | |
| WO | WO 2007/131701 A2 | | 11/2007 | |
| WO | WO 2007/149221 | | 12/2007 | |
| WO | WO 2008/132603 A1 | | 11/2008 | |

* cited by examiner

METHOD AND TEMPERING DEVICE FOR HEATING PREFORMS PRIOR TO MOLDING THE SAME TO FORM CONTAINERS

This claims the benefit of German Patent Application DE 10 2009 025 839.6, filed May 19, 2009 and hereby incorporated by reference herein.

The invention relates to a method of heating preforms prior to molding the same to form containers. Moreover, the invention relates to a tempering device for heating preforms.

BACKGROUND

Thin-walled plastic containers of thermoplastic material such as PET usually are produced from injection-molded parisons, so-called preforms, and molded to form containers in a two-stage stretch blow molding method. During the processing, the preforms are heated to a defined process temperature to allow for the molding process during stretch blow molding. Here, the preforms first are heated by means of stretch blow molding machines in a heating path to sufficiently heat the relatively thick-walled preforms across the entire cross-sections thereof, so that a hollow body can be formed with the ensuing molding process by means of a stretch blow molding method. Heating in the heating path may take place by means of infrared radiation, for example. Such infrared radiation has the advantage that the radiation partly penetrates the material (PET, in most cases), so that good heating of the preform across the entire cross-section thereof can be guaranteed in this way. When passing through the heating path, the preforms may, for example, be placed on a heating mandrel, so that they can be set in rotation for achieving uniform heating across the circumference when passing the IR radiators.

A preform substantially consists of a mouthpiece region already fabricated to final dimensions and a body region still to be molded. The two regions must be kept thermally separated from each other as far as possible during tempering of the preform, since when the mouthpiece is heated too strongly, the dimensional stability thereof may be compromised and/or the mouthpiece may be deformed. Yet, especially the region directly below the mouthpiece needs to be heated more strongly so as to be able to ensure a reliable blow molding process.

In known tempering devices, certain regions of the preform are heated more strongly, the neck region in particular. WO 92/15442 A1 discloses a method and a device for producing blow-molded hollow bodies from plastics, such as PET. Here, a cast, hollow preform in a heated state is placed in a blow mold and brought into a desired hollow-body shape while stretching the material of the wall thereof, wherein the wall is subjected to different degrees of stretching in from region to region, depending on the desired hollow-body shape. In addition, regions of the wall, a neck region in particular, are heated additionally prior to blow molding. In this method, transition regions of the wall of the preform between wall regions with different degrees of stretching are to be heated additionally.

DE 20 2008 005 252 U1 describes a lamp device as well as a heating path for heating preforms having a support ring, for the production of containers, such as bottles. The lamp device forms a radiation source and includes a reflector for the reflection of radiation emitted from the radiation source. The reflector extends over an angle greater than 200 degrees in circumferential direction of an axis passing through the radiation source. Hereby, directed radiation is to be generated, tempering the preform in preferred regions.

Furthermore, DE 696 23 606 T2 discloses a method and a device for selectively heating a preform of a container, such as a bottle, of thermoplastic material. Heating takes place by means of lamps generating directed radiation. After the heating process, the hot preform is subjected to a blow molding or blow draw molding process. The radiation of the lamps is emitted in such a focused manner with the aid of optical focusing means as desired onto the preform such that the same substantially is heated only in the regions to be molded.

The infrared radiation is absorbed by the preform material up to a certain degree only. This absorbance depends on the wall thickness of the preform, on the preform material used for the preform, on additives added, and on other factors, as the case may be. However, there still is radiation piercing the walls of the rotationally symmetrical preform and then again penetrating on the respective opposite side. This distribution of radiation can be utilized advantageously, because the energy input into the preform can be increased in this way. Given this distribution of radiation, however, radiation proportions having an angle of radiation directed upward to the mouthpiece are deflected directly to the mouthpiece or the support ring and heat these regions.

For targeted distribution of radiation, and particularly for shielding the threaded portion of a preform to be heated, JP 2008 000 972 A proposes introducing, into the interior of a preform to be heated from the outside by means of infrared radiation sources, a rod of titanium-containing metal at least partly reflecting a radiation proportion piercing the walls thereof.

In the known prior art, however, overheating of the support ring still occurs in some cases, so that the same becomes deformed by the power transmitted via the blowing nozzle during the blow molding process.

SUMMARY OF THE INVENTION

It is an object of the present invention to provide an improved, targeted and largely influenceable tempering of the preform, so that its threaded region and its support ring cannot be heated, or only heated slightly, and its neck region can be heated in a manner as defined as possible so as to be able to perform the blow and/or stretch blow molding process following the heating in a manner that can be defined as exactly as possible.

The present invention further provides a method of largely uniformly and/or regionally selectively heating a preform of thermoplastic material prior to blow molding the same to form a container, if need be with concurrent cooling of a threaded region of the preform, by temporarily increased heating, as compared to other regions, of a neck portion of the preform close to the threaded portion. In this way, it can be achieved that the plastics material of the preform is heated non-uniformly so that the gradual tempering of the plastic when passing through the heating path takes place in a delayed manner in the neck region, which also strongly mitigates the heating of the threaded region and of the collar ring and/or enables largely preventing the same. While problems due to excessive heating of the neck region as well as stray radiation to the mouthpiece usually may develop when heating this rotating body, the method according to the invention allows for shielding the mouthpiece from the effect of heat during tempering to such an extent that the same remains largely cool. It may selectively be provided that heating the neck portion of the preform close to the threaded portion takes place in a delayed manner and/or in a generally variable manner and/or in a manner temporally increased in intensity so as to achieve the desired non-uniform heating of the preform. Additionally or alternatively, it may also be provided that heating the preform and/or the neck portion thereof is performed with a varied location of the radiation wavelength maximum.

Since shielding the mouthpiece would be relatively intensive and therefore expensive for reasons of machine technology, and further since a thicker shielding would also shield too much material below the mouthpiece, which can no longer be stretched and hence is no longer available for the container body, but overheating of the mouthpiece becomes increasingly problematic due to the trend to lighter and lighter mouthpieces and support rings, on the other hand, variably heating the preform according to the invention provides a way of molding thin-walled containers that leads to the desired results without such shielding.

In the case of the light and hence very thin-walled containers that are employed increasingly often, the wall thickness differences in the preforms also become less and less. Hence, clean "neck pull-off" often cannot be ensured by the preform design alone, but must be supported more and more often by strongly heating the preform regions below the support ring. However, this is associated with additional heat-up of the mouthpiece due to intensified heat transfer and/or due to an increased proportion of stray radiation. The outside diameter of the preform in the area below the support ring is determined by the cavity side of the injection molding tool. Modifying the tool in this area would be very expensive and would entail follow-up costs, e.g. due to necessary changes to the so-called neck centering plate in the blow molds, but also in the installation parts of existing bottling lines with neck handling. For this reason, it often does not make sense to change the outside diameter of the preform in this area even if the design of the preform is to be modified with regard to weight optimization. On the other hand, the inside diameter of the preforms in the region directly below the support ring can hardly be changed, because it is determined substantially by the inside diameter of the mouthpiece, which in turn depends on the commercially available closure systems and therefore cannot be increased. For this reason, changing the wall thickness of the preform directly below the support ring does not make sense in practice. As a result, this wall thickness also remains the same even in a preform that is optimized in terms of weight and reduced in its remaining wall thickness. In contrast thereto, the wall thickness of the remaining preform body is reduced, usually by exchanging the core side of the injection molding tool so that the same has a larger core diameter.

This results in a small wall thickness in the preform body and a largely constant wall thickness directly below the support ring, from which, particularly in preforms having a mouthpiece that is larger than the preform body, the following problem may arise. Due to the greater diameter directly below the support ring and wall thicknesses becoming more and more similar, a larger cross-sectional area is generated in the region below the support ring than in the rest of the preform body. Yet, the material "tear-off" in stretch blow molding begins at the location at which the material is relatively weak due to the reduced wall thicknesses and the tension acting on the material at the same time is relatively high. What is desirable—particularly in very thin-walled, weight-optimized preforms—is tear-off directly below the support ring, in order to optimally utilize the material of the preform. However, since the cross-sections work against this (large cross-section and little tension below the support ring), this problem must be countered with targeted weakening of the material. Such yielding or "weakening" of the plastics material to be stretched can only be achieved via increased temperature in the neck region below the support ring, which temperature must be higher than in the area of the preform body.

In order to achieve this desired temperature gradient without overheating the mouthpiece, it is provided, according to the present invention, to heat a defined zone without stray radiation by directed heat-up in parallel to the support ring directly below the support ring so that—independently of the preform geometry—a hot ring or so-called belt at which clean neck pull-off can be adjusted and ensured in a defined manner develops here. In order to minimize the heat conduction from the preform body into the mouthpiece region, the heat-up of this region should first be delayed and then finally take place at the end of the heat-up process, and that in a period of time as short as possible. Due to the fact that the neck pull-off can be ensured in the manner described, the preform body can be heated independently therefrom, namely so that substantially lower temperatures can be utilized there. The lamps for heating up the remaining preform body may be moved further away from the mouthpiece in the direction of the preform rotation axis, so that the stray radiation in the direction of the mouthpiece loses intensity to the third power per distance. At the same time, material neck pull-off can be achieved directly below the support ring, which ensures optimum material utilization without thereby thermally jeopardizing the mouthpiece. Apart from this effect of a cooler mouthpiece, a significantly reduced energy need for heating up the entire preform is achieved for such cases. Heating the region below the support ring in a defined belt-like form may, for example, take place by means of laser radiation, by means of an open flame, e.g. a gas flame, applied from the outside and the inside, if required, by means of diodes radiating in the IR frequency range, by means of directed microwave radiation, and/or by means of parallelized infrared radiation.

The method according to the invention serves for largely uniformly and/or regionally selectively heating a preform of thermoplastic material prior to blow molding the same to form a container with concurrent cooling of a threaded region at which the preform is held during heating thereof. The temporarily delayed and/or variable and/or, in its intensity, temporarily increased heating of a neck portion of the preform close to the threaded portion is characteristic of the method. As already described before, the preform may selectively be heated, at an intensity lower as compared to the remaining regions, in the neck region thereof in a first phase of heating the same, so that the heat transfer into the threaded region to be cooled is weakened significantly. Furthermore, it makes sense to heat the preform, at an intensity increased as compared to the remaining regions, in the neck region thereof in a second phase of heating the same, so that the neck pull-off can take place in a failure-free manner in the way described, without the region of the preform with the support ring and the threaded region adjacent thereto being compromised in any way during the stretch blow molding process. Preferably, the second phase is shortened as compared to the first phase. Besides, the second phase of heating should be immediately followed by the process of blow molding the preform to form a container, so that the processes can be controlled accurately and the heat development in the material as well as the heat input into the preform can take place in a constant and reproducible manner for ensuring consistently high quality of fabrication.

Heating may take place in most diverse ways, e.g. by means of infrared irradiation, by means of laser beams, by means of microwave irradiation, and/or by means of at least one open combustion flame. A plurality of heat sources, which are to provide for as-uniform-as-possible tempering of the preform. Moreover, it may be provided that the infrared irradiation and/or the one generated by means of laser beam means is temporarily variable by varying the wavelength of its radiation maximum. Thus, it may be advantageous that the infrared irradiation has a wavelength with a radiation maximum greater than 1250 nm in the second phase of the irradiation. Irradiation in such a long-wave infrared range may be particularly favorable for the neck regions, since the penetration depth of this type of radiation is relatively small, which corresponds well to the small wall thicknesses in these regions of the preform. In this way, it can effectively be prevented that too many radiation proportions pierce the irradiated walls and lead to further heating at the opposite walls on the inside of the preform. This additional heating may be undesired in the interest of maximally precise control of the heat input.

Optionally, however, it may also be provided that at least the neck portion of the preform is heated and/or irradiated on its outside as well as on its inside, optionally by targeted penetration of the walls and irradiation of the opposite wall regions from the inside thereof. In this context, it may also be advantageous to work with additional auxiliary means for radiation distribution, e.g. with suitably shaped reflector means. Thus, the heating and/or irradiation of the inside of the preform may be influenced, directed, and/or distributed with a reflector arranged in the neck portion thereof. In this way it is achieved that the reflector distributes and/or deflects the infrared and/or microwave irradiation employed for heating after piercing the neck region of the preform that is at least partially transparent to the radiation and the radiation impinging on a reflector area to above and/or below the pierced regions by reflection.

A variant of such reflector that can be used advantageously for the desired purpose can e.g. be formed by a paraboloid-like mirror. The basis thereof is the physically known effect of the concave mirror (paraboloidal mirror). This concave mirror should be aligned so that the focal point is located in the critical pull-off region of the preform below the support ring. Incoming radiation is reflected to the focal point with the mirror and heats the problematic zones in a targeted manner from the inside. This variant has two substantial advantages, inter alia, because the unintentional heating of the mouthpiece is reduced by the reflected portion of the radiation. Moreover, the reflected radiation proportions are not lost, but can be utilized optimally for tempering the preform.

In connection with such a reflector, it may be of advantage to arrange the reflector so that the same is e.g. fixedly disposed on a holder or holding means and passes through the heating path together with the preform to be heated, which can be achieved by a suitable holder that is attached e.g. at a gripper for the preform. However, such a coupling is not at all absolutely necessary; the radiation sources may optionally also be fixedly installed in the heating chamber and/or in the heating path.

Furthermore, the above-mentioned object of the invention is achieved by a tempering device for largely uniformly and/or regionally selectively heating a preform of thermoplastic material prior to blow molding the same to form a container. The tempering device includes at least one radiation and/or heat source acting on the preform and, if applicable, an optional cooling means for a threaded region on which the preform is held during heating thereof. The tempering device according to the invention is characterized in that the at least one radiation and/or heat source acting on the preform defines a plurality of impact regions on the preform with respectively different heating intensities.

In the tempering device according to the invention, it is additionally provided that the preforms to be tempered comprise at least one reflector disposed in the threaded and/or neck region for deflecting radiation proportions piercing the neck region and for heating the neck region on an inside of the preform. With such a reflector, a particularly precise tempering of the neck region can be controlled and influenced. In addition, radiation proportions piercing the transparent neck region and being directed to the support ring or the threaded region disposed thereabove can be reflected and advantageously used for heating the inner walls of the neck region.

Optionally, this reflector area or these reflector areas can be formed in an adjustable manner with respect to their position(s) and/or surface(s), so that e.g. in the course of the transport of the preform through the heating path, a variation of the radiation of different portions of the preform or the neck regions thereof is possible. For example, adjustable reflector areas can be provided, which may be formed as a slidable reflector, a reflector with a variety of separately controllable microarrays, as a flexible mirror, etc. Alternatively or in addition, a slidable shielding in the neck region can be provided, which may be formed in the interior of the preform to be slidable along its longitudinal axis. This slidable shielding may optionally be formed as a slidable reflector cylinder, the surface area of which may comprise a reflective surface and/or a suitable structure for deflecting impinging radiation in a desired direction.

In the tempering device according to the invention, in particular a plurality of radiators with respectively different radiation intensities can be employed. Optionally, individual ones or all of the plurality of radiators can be operated with variably adjustable radiation intensities each. These radiators can be formed as lens radiators and/or as so-called parabolic radiators. For example, in such an embodiment, e.g. one or more lens radiators can be provided, which is/are disposed in the heating path as a radiation source for tempering the preforms prior to blow molding. The lens radiator is part of the heating means, which comprises a plurality of such radiators for generating infrared heat radiation in the course of the heating path. Optionally, several conventional tube radiators as well as some lens radiators of that kind can be combined. Such a lens radiator can e.g. comprise a cylinder-shaped glass tube with a coaxially disposed glow filament, which radiates infrared light uniformly in all directions. Here, a major portion of the inner surface area of the glass tube is preferably provided with a reflective coating providing for a reflection of the light proportions to an exit face. A defined region of the glass tube to form the exit face is formed as a lens in this variant, which lens provides for a bundling of the exiting light and for the parallelization thereof. In cross section, the reflective coating can cover an angle segment e.g. of approx. 180 degrees or more, while the exit face with the lens formed therein can cover an angle segment e.g. of slightly more than 90 degrees, preferably, however, approx. 180 degrees or slightly less than 180 degrees. The infrared light radiated from the glow filament of the lens radiator is preferably reflected by the coating in a diffuse manner and refracted on the lens such that it is radiated outside the tube in an almost parallel manner. The heating region defined and covered by such radiators can thus be limited very precisely, which is why the heating region can be made very small and adjusted very precisely to the portions of the preforms to be heated, if required. Thus, the heating region can be selected to be slightly smaller than the diameter of the glass tube. The lens formed in the glass tube can preferably be realized by a suitable thickening in the glass during the manufacture thereof. A correspondingly grinded lens is not required. With the molding of the glass tube, the impact direction of the infrared radiation can be directed and guided in a targeted manner to the points and regions of the preforms where they can provide for the desired tempering in the required extent. Instead of using sheet-metal deflectors or reflectors, the invention according to the illustrated embodiment suggests providing optical reflection and refraction means by a tube modified in the described manner.

Optionally, alternative embodiments of the heating sources of the heating means are possible, e.g. in the form of a so-called parabolic radiator. One or more such parabolic radiators can selectively be combined with conventional infrared radiators and/or with lens radiators according to the above-described embodiment, in order to serve as radiation sources in the heating path for tempering the preforms prior to blow molding. Such a parabolic radiator comprises a glass tube with an oval or ellipse-shaped cross section. Disposed in a focus of the ellipse shape is the glow filament, which uniformly radiates infrared light in the radial direction. A reflective coating can be disposed on the inner surface area of the glass tube such that the region around the glow filament is covered by the coating. In this way, the light radiated in the direction of the coating is radiated parallely forward in the direction of an uncoated exit face and exits the glass tube of the parabolic radiator as almost parallel infrared light. The uncoated exit region of the glass tube does not comprise a thickened wall and does thus not act as a lens, as this is the case in the previously described variant. Such a lens action is not required in the variant of the parabolic radiator, since the ellipse shape of the tube cross section in connection with the backside reflective coating disposed in the region around the glow filament provides for the desired parallelization of the exiting infrared light.

Moreover, it may be particularly advantageous if the tempering device according to the invention includes several radiators having a variable radiation characteristic with variable radiation maxima of the emitted wavelength ranges.

The lamps that can be used for the tempering device according to the invention are capable of radiating a relatively broad wavelength spectrum in the infrared range. By changing the radiator temperature, one can shift the position of the radiation intensity maximum of such a lamp. A relatively low radiator temperature with a long-wave beam spectrum can be produced with low energy effort. However, this radiation exhibits a relatively lower penetration depth, so that it often does not sufficiently penetrate into the deeper material layers of the heated preform from the surface thereof. For thick-walled preforms, the penetration depth achieved thereby may not be sufficient in some cases, so that a sufficient heating of the material cannot be ensured. In contrast, thin-walled preforms can be heated very efficiently with such a long-wave radiation. A further disadvantage of the long-wave radiation is the low power densities that can be achieved therewith, as the radiation maximum is lower.

In contrast, higher radiator temperatures have the advantage that the radiation penetrates very deeply into the plastic material to be heated. As a countermove, this leads to relatively high energy costs and a shorter service life of the used lamps. There is also the risk of a too low radiation absorption occurring in the material in thin-walled preforms due to the great penetration depth, so that the efficiency of the energy input deteriorates as a result.

In order to combine the mentioned advantages and to eliminate the disadvantages to the greatest possible extent, two or more different lamp types can be installed in the course of the heating path and thus along the path of the preform through the furnace, wherein these lamp types should differ in that they have their radiation maximum at different points in the spectrum. Depending on the design and the wall thickness of the preforms to be heated, these lamps can be used in different proportions. In thin-walled preforms, rather the lamps with long-wave radiation spectra can be used, while in thick-walled preforms, the lamps with short-wave radiation spectra are rather used.

Since preforms with relatively thin walls are often used for the production of small bottles, a variant might be conceivable in which the "top" lamp(s) is/are equipped with long-wave radiators in a heating box (hanging heating, i.e. the lamp heating the material below the support ring) across the whole or most of the furnace length, since these preforms are shorter and thus only these lamps are efficient for heating the preforms. Especially the particularly thin area below the support ring, i.e. in front of the transition into the cylindrical wall thickness, is predestined for this. The lower radiation intensity of the long-wave radiators could be moderated e.g. by heating from both sides, wherein the lamps may be disposed opposite to each other.

A further possibility of varying the radiation is the use of lamps with two or more different reflector types, such as those with different material layers. The layers of a reflector of a first type may be composed as follows. The reflection body is composed of at least two components, wherein a first component comprises a first surface at least partially transparent for the radiation emitted from the energy source. This surface can e.g. be composed of glass, in particular of quartz glass, and may preferably be formed as at least one pane, pressed glass, or several glass segments. In contrast, a second component can comprise a layer the material of which is selected from a group of materials consisting of aluminum, chromium, nickel, copper, gold and/or at least one alloy of at least one of these metals, and which rests on the first component in at least some area(s). Moreover, the second component can comprise a second, preferably structured surface. Furthermore, it is useful if at least one portion of the second component is reflective for the radiation and opaque for long-wave beams. Thus, for example reflective ceramics can be used as a reflector of the second type.

Both reflectors may be profiled in a prism or parabolic-shaped manner and be located both behind the IR lamp and on the opposite side behind the preform.

The preforms to be heated pass the radiators along a transport path before they are transferred into a blowing station.

Further features, objects, and advantages of the present invention will be apparent from the following detailed description of a preferred embodiment of the invention, which is not intended as a limiting example and refers to the accompanying drawings. Like parts have like reference numerals in principle and are sometimes not repeatedly explained.

DETAILED DESCRIPTION

Figure 1:
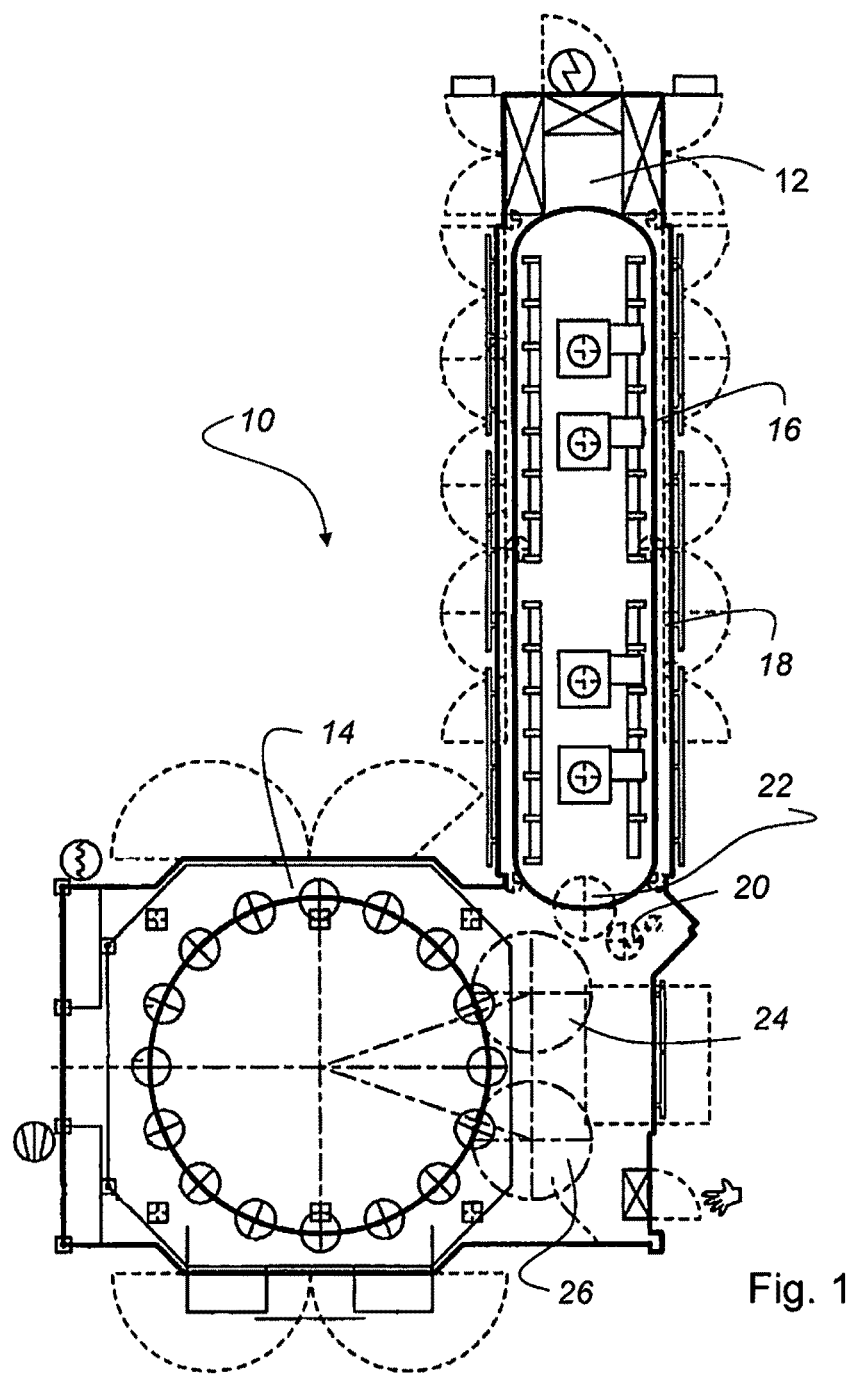
FIG. 1 shows a schematic illustration of the processing of preforms of thermoplastic material to form stretch-blow molded containers.

The schematic illustration of FIG. 1 schematically shows a typical sequence of stages in the processing of preforms of thermoplastic material to from stretch-blow molded containers. For example, FIG. 1 shows a device 10 with which containers or plastic bottles can be produced substantially by a stretch blow molding method. The device 10 includes a heating path 12 in which the preforms for the containers or plastic bottles to be produced are brought to a molding temperature required for the stretch blow molding method. The heating path 12 is adjoined by a blow molding machine 14. Within the heating path 12, a conveyor 16 is provided, which feeds a plurality of preforms past heat sources or a heating means 18 of the heating path 12. At a handover position, the preforms are fed to the heating path 12. At an output position 22, the preforms tempered as desired are handed over to an input position 24 for the blow molding machine 14. At an output position 26 of the blow molding machine 14, the finished containers or plastic bottles are output for further processing, e.g. to a filling station (not shown).

Figure 2:
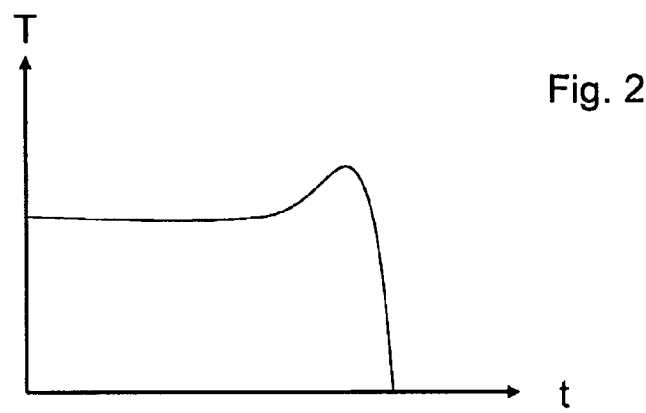
FIG. 2 shows, on the basis of a diagram, the typical time behavior of the energy input in a neck region of a preform.

The qualitative diagram of FIG. 2 explains the typical time behavior of the temperature T acting on the preforms during their transit time t through the heating path, and thus the energy input acting on the neck region of the preforms. It can be seen that the temperature initially has a low value in order for the temperature gradient required for the optimal tempering to be obtained without overheating the mouthpiece of the respective preform. With the help of the illustrated temperature course, a defined heating zone can be formed directly below the support ring, which forms a hot ring or so-called belt on which a clean neck pull-off can be set and ensured in a defined manner. In order to minimize the heat conduction from the preform body into the mouthpiece region, the heating of this region initially has to be delayed and finally has to be performed at the end of the heating process in a relative short period of time with a slightly increased temperature. In the manner described, the preform can selectively be heated with a lower intensity with respect to the remaining regions in its neck region in a first phase of its heating, so that the heat conduction into the threaded region to be cooled is clearly reduced. As becomes clear from FIG. 2, the preform is intended to be heated with a higher intensity with respect to the remaining regions in its neck region in a second phase of its heating, so that the neck pull-off can be performed without incidents in the described manner, without affecting, overstretching and/or otherwise overstraining the neck region of the preform with the support ring and the threaded region adjoining thereto in any manner possible during the stretch blow molding process. Preferably, the second phase is shorter with respect to the first phase. In addition, the process of blow molding the preform to form a container should immediately follow the second phase of heating. This can contribute to controlling the processes in an exact manner and to tracking the heat development in the material and the undesired heat conduction into the mouthpiece of the preform in a controlled manner.

Figure 3:
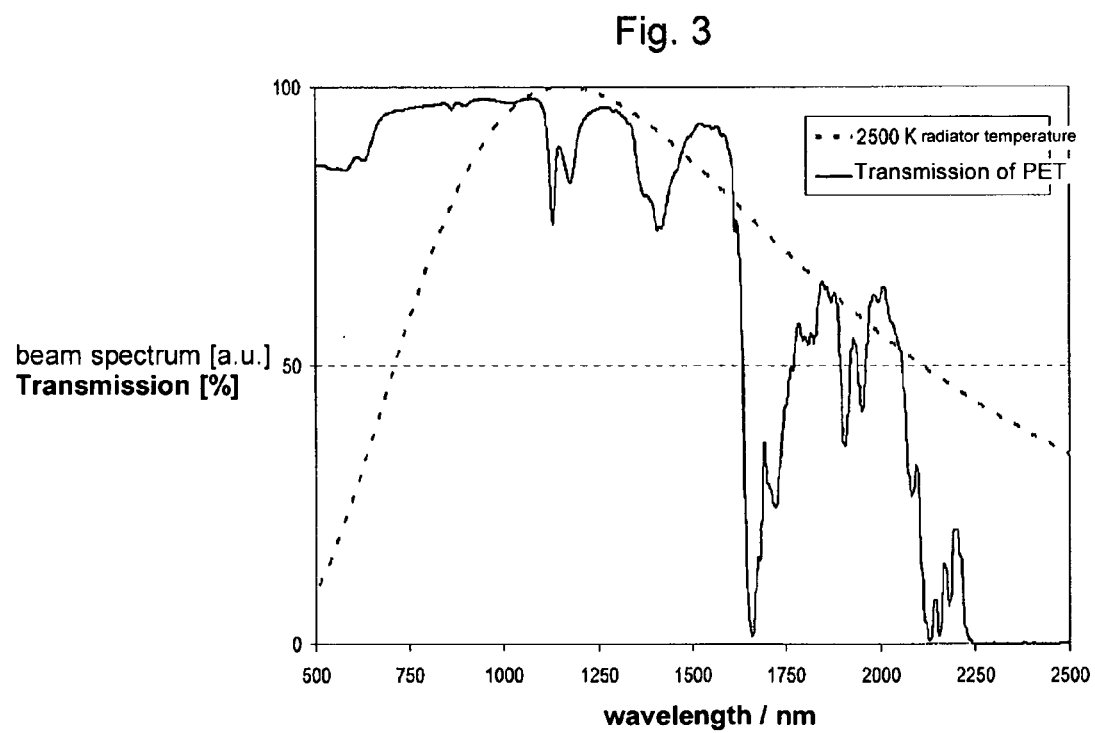
FIG. 3 shows a diagram with a transmission degree of PET as well as a beam spectrum for a temperature of 2500 K plotted over a wavelength course.

The diagram of FIG. 3 shows a typical course of a transmission degree of PET in percent (0 to 100) plotted over a wavelength of 500 nm to 2500 nm, and of a beam spectrum for a radiator temperature of 2500 K plotted over the same abscissa (wavelength in nm). Conventional and standard IR lamps radiate a relatively broad wavelength spectrum in the infrared range. By changing the radiator temperature, one can shift the position of the radiation intensity maximum of such a lamp. Lamps that are operated in a relatively cold state rather have this maximum in a long-wave range (>1500 nm), lamps operated in a very hot state rather in a short-wave range (<1100 nm). Tests can show that both modes of operation of the lamps have advantages.

A relatively low radiator temperature with a long-wave beam spectrum can be produced with relatively little energy for the lamps, so that that the heat produced therewith can be provided at lower costs. However, this radiation exhibits a low penetration depth, so that it often does not sufficiently penetrate into the deeper material layers of the heated preform from the surface thereof. For thick-walled preforms, the penetration depth achieved thereby is mostly not sufficient, since a heating of the material cannot be ensured. In contrast, thin-walled preforms can be heated very efficiently with such a long-wave radiation. A further disadvantage of the long-wave radiation is the low power densities that can be achieved therewith, as the radiation maximum is lower.

In contrast, high radiator temperatures have the advantage that the radiation penetrates very deeply into the plastic material to be heated. As a countermove, this leads to relatively high energy costs and a shorter service life of the used lamps. There is also the risk of a too low radiation absorption occurring in the material in thin-walled preforms due to the great penetration depth, so that the efficiency of the energy input deteriorates as a result.

In order to combine the mentioned advantages and to eliminate the disadvantages to the greatest possible extent, two or more different lamp types can be installed in the course of the heating path and thus along the path of the preform through the furnace, wherein these lamp types should differ in that they have their radiation maximum at different points in the spectrum. Depending on the design and the wall thickness of the preforms to be heated, these lamps can be used in different proportions. In thin-walled preforms, rather the lamps with long-wave radiation spectra can be used, while in thick-walled preforms, the lamps with short-wave radiation spectra are rather used.

Since preforms with relatively thin walls are often used for the production of small bottles, a variant would be conceivable in which the "top" lamp(s) is/are equipped with long-wave radiators in a heating box (hanging heating, i.e. the lamp heating the material below the support ring) across the whole or most of the furnace length, since these preforms are shorter and thus only these lamps are efficient for heating the preforms. Especially the particularly thin area below the support ring, i.e. in front of the transition into the cylindrical wall thickness, is predestined for this. The lower radiation intensity of the long-wave radiators could be moderated e.g. by heating from both sides, wherein the lamps may be disposed opposite to each other.

A further possibility of varying the radiation is the use of lamps with two or more different reflector types, such as those with different material layers. The layers of a reflector of a first type may be composed as follows. The reflection body is composed of at least two components, wherein a first component comprises a first surface at least partially transparent for the radiation emitted from the energy source. This surface can e.g. be composed of glass, in particular of quartz glass, and May preferably be formed as at least one pane, pressed glass, or several glass segments. In contrast, a second component can comprise a layer the material of which is selected from a group of materials consisting of aluminum, chromium, nickel, copper, gold and/or at least one alloy of at least one of these metals, and which rests on the first component in at least some area(s). Moreover, the second component can comprise a second, preferably structured surface. Furthermore, it is useful if at least one portion of the second component is reflective for the radiation and opaque for long-wave beams. Thus, for example reflective ceramics can be used as a reflector of the second type.

Both reflectors may be profiled in a prism or parabolic-shaped manner and be located both behind the IR lamp and on the opposite side behind the preform.

Figure 4:
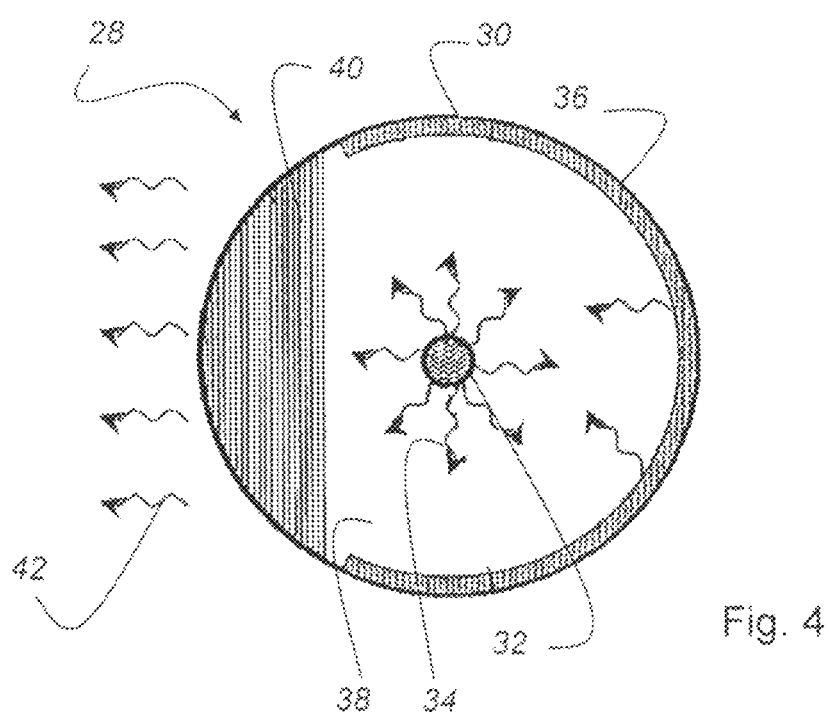
FIG. 4 shows a schematic illustration of a lens radiator disposed in the heating path as a radiation source for tempering the preforms prior to blow molding.

The schematic illustration of FIG. 4 shows a lens radiator that can be disposed in the heating path as a radiation source for tempering the preform prior to blow molding. The lens radiator 28 is part of the heating means 18 (cf. FIG. 1), which in the course of the heating path 12 comprises a plurality of such radiators for generating infrared heat radiation. Optionally, several conventional tube radiators (not shown) and some of the lens radiators 28 shown in FIG. 4 can be combined. The lens radiator 28 shown in cross section in FIG. 4 includes a cylinder-shaped glass tube 30 with a coaxially disposed glow filament 32, which radiates infrared light 34 uniformly in all directions. A major portion of the inner surface area of the glass tube is provided with a reflective coating 36 providing for a reflection of the light proportions to an exit face 38. A defined region of the glass tube 30 to form the exit face 38 is formed as a lens 40, which provides for a bundling of the exiting light 42 and for the parallelization thereof, as this is suggested in FIG. 4. In the shown embodiment, the reflective coating 36, which is e.g. formed by a metallic coating or the like, covers an angle segment of slightly more than 180 degrees in cross section, while the exit face 38 with the lens 40 formed therein covers an angle segment of slightly more than 90 degrees.

The light generated by the glow filament 32 of the lens radiator 28 is preferably reflected by the coating 36 in a diffuse manner and refracted on the lens 40 such that it is almost parallel outside the tube 30. The heating region of the respective, correspondingly formed radiators 28 can thus be defined very precisely by the position and orientation of the radiators 28, which is why the heating region can be made very small and adjusted very precisely to the portion of the preforms to be heated, if required. Thus, the heating region can be selected to be slightly smaller than the diameter of the glass tube 30.

What is shown as the lens 40 of the exit face 38 in the illustrated embodiment can in particular be realized by a suitable thickening in the glass during the manufacture of the glass tube 30. A correspondingly grinded lens is not required. With the molding of the glass tube, the impact direction of the infrared radiation can be directed and guided in a targeted manner to the points and regions of the preforms where they can provide for the desired tempering in the required extent. Instead of using sheet-metal deflectors or reflectors, the invention according to the illustrated embodiment suggests providing optical reflection and refraction means by a tube 30 modified in the described manner.

Figure 5:
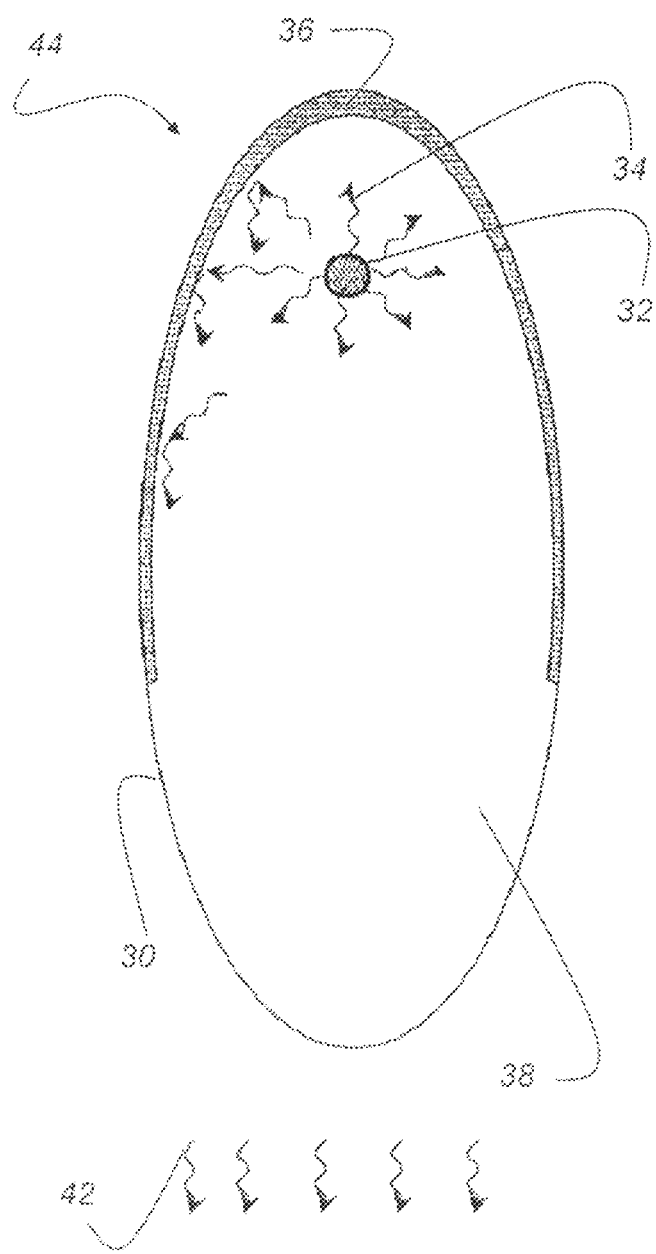
FIG. 5 shows a schematic illustration of a parabolic radiator disposed in the heating path as a radiation source for tempering the preforms prior to blow molding.

The schematic illustration of FIG. 5 shows an alternative embodiment of one of the heating sources of the heating means 18 according to FIG. 1 in the form of a parabolic radiator 44. One or more such parabolic radiators 44 can selectively be combined with conventional infrared radiators and/or with lens radiators 28 according to FIG. 4, in order to serve as radiation sources in the heating path 12 for tempering the preforms prior to blow molding.

The parabolic radiator 44 according to FIG. 5 comprises a glass tube 30 with an oval or ellipse-shaped cross section. Disposed in a focus of the ellipse shape is the glow filament 32, which uniformly radiates infrared light 34 in the radial direction. A reflective coating 36 can be disposed on the inner surface area of the glass tube 30 such that the region around the glow filament 32 and slightly more than half of the cross section of the glass tube are covered by the coating 36. In this way, the light 34 radiated in the direction of the coating 36 is radiated parallely forward in the direction of an uncoated exit face 38 and exits the glass tube 30 of the parabolic radiator 44 as almost parallel light 42. The uncoated exit region 38 of the glass tube 30 does not comprise a thickened wall and does thus not act as a lens, as this is the case in the variant shown in FIG. 4. Such a lens action is not required in the variant shown in FIG. 5, since the ellipse shape of the tube cross section in connection with the backside reflective coating 36 disposed in the region around the glow filament 32 provides for the desired parallelization of the exiting infrared light 42.

Figure 6:
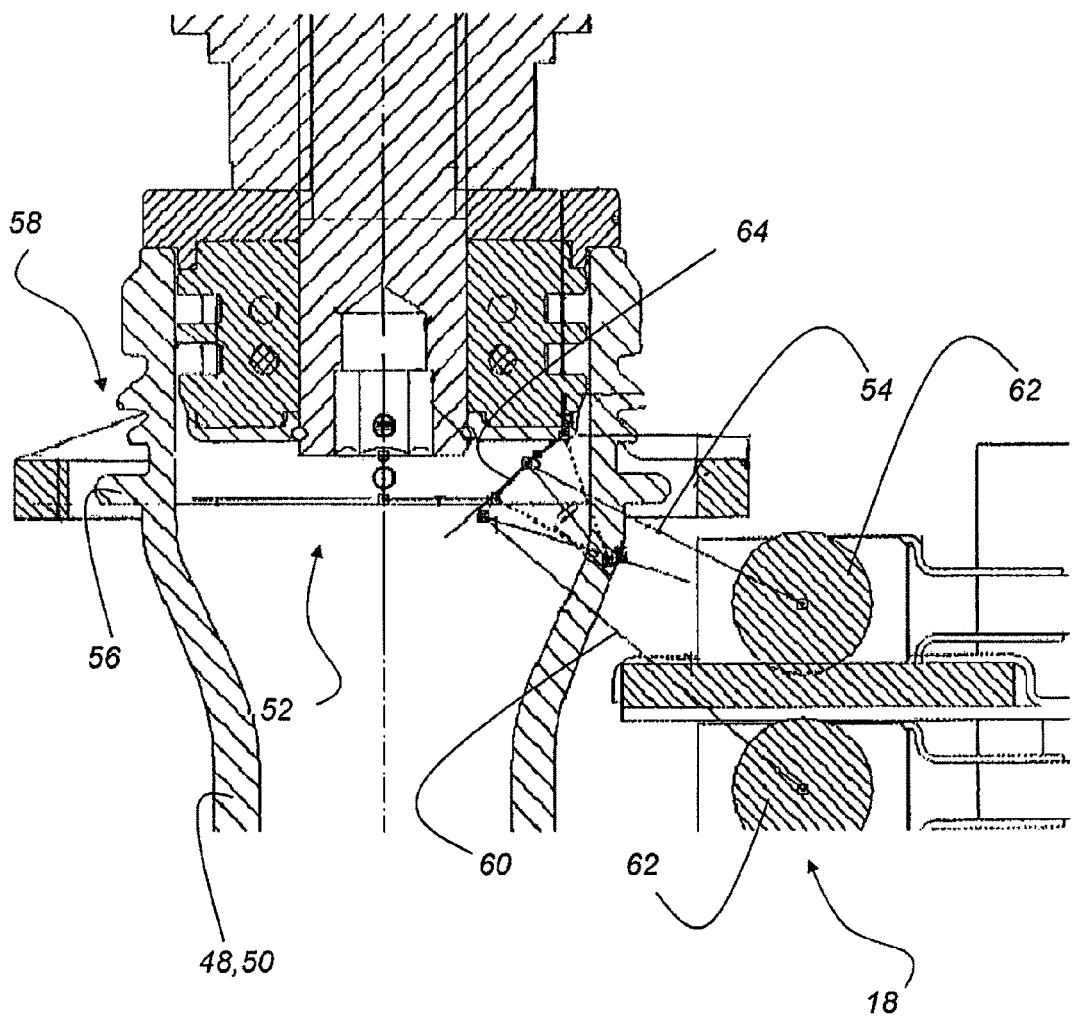
FIG. 6 shows a longitudinal view of a reflector means disposed in the neck region of a preform.

The schematic illustration of FIG. 6 shows a longitudinal section of a reflector 52 disposed in the neck region 48 of a preform 50. In this variant of the heating means, the preforms 50 to be tempered have associated therewith a reflector 52, disposed in the threaded and/or neck region 48, for deflecting radiation proportions 54 piercing the neck region 48 and for heating the neck region 48 on an inside of the preform 50. With this reflector 52, the neck region 48 can be tempered in the desired manner. In addition, radiation proportions 54, which pierce the transparent neck region 48 and are directed to the support ring 56 or the threaded region 58 disposed thereabove, can be reflected in a desired direction by means of the reflector means and can advantageously be used for heating the inner wall 60 of the neck region 48.

If the positions of the radiation sources 62 of the heating means 18 remain always constant with respect to the neck region 48 of the preform 50 and if always the same preforms 50 with a predetermined wall thickness are to be tempered, the reflector 52 can be fixed in an optimum manner. However, it can also be advantageous to provide an adjustable reflector 52, in particular in view of a universal applicability of differently shaped and dimensioned preforms 50. In one possible embodiment, the radiation sources 62 are moved through the heating path together with the preform 50 and remain fixed relative to it, in order to obtain constant reflection conditions at any time. According to an alternative variant, the radiation sources 62 are disposed in the heating path in a stationary manner and are not moved through the heating path together with the preform 50.

In an alternative variant of the adjustable reflector 52, a reflector area 64 can selectively be formed in an adjustable manner with respect to its position and/or its surface contour, so that e.g. during transport of the preform 50 through the heating path 12, a variation of the radiation of different portions of the preform 50 or its neck region 48 is possible. Thus, for example adjustable reflector areas 64 can be provided, which may be formed as a slidable reflector or a plurality of slidable reflectors, as a reflector with a variety of separately controllable microarrays, as a flexible mirror, etc.

Finally, it is pointed out that the above-described invention is not to be considered as limited to the illustrated embodiments. Instead, a multitude of variants and modifications is conceivable, which make use of the inventive concept and therefore also fall within the scope of protection.

LIST OF REFERENCE NUMERALS 10 device
12 heating path
14 blow molding machine 16 conveying means
18 heating means
20 handover position
22 output position
24 input position
26 output position
28 lens radiator
30 glass tube
32 glow filament
34 emitted light
36 reflective coating
38 exit face
40 lens
42 exiting light
44 parabolic radiator
48 neck region
50 preform
52 reflector means
54 radiation proportions
56 support ring
58 thread
60 inner wall
62 radiation source
64 reflector area

What is claimed is:

1. A method of heating a preform of thermoplastic material prior to blow molding the same to form a container, with the preform being held at a threaded region during heating thereof, comprising:
heating a neck portion of the preform close to the threaded region; the heating of the neck portion close to the threaded region including a first phase and a second phase, during the second phase the heating of the neck portion close to the threaded region being at an increased intensity as compared to all of the other regions, the heating of the neck portion during the second phase occurring after a heating of the other regions during the first phase; and
directly following the second phase, blow molding the preform to form the container;
the heating of the neck portion close to the threaded region being at a lower intensity as compared to the other regions during the first phase of the heating;
wherein the heating includes utilizing a reflector formed by a paraboloidal mirror, and a glow filament disposed within the paraboloidal mirror.

2. The method as recited in claim 1 wherein the heating includes at least one of: temporarily delaying the heating, varying the heating and altering a location of a radiation wavelength maximum as compared to the other regions.

3. The method as recited in claim 1 wherein the second phase is shortened as compared to the first phase.

4. The method as recited in claim 1 wherein the heating includes utilizing at least one of infrared irradiation, a laser beam, microwave irradiation and at least one open combustion flame.

5. The method as recited in claim 4 wherein the heating includes utilizing the infrared radiation or the laser beam, and the infrared irradiation or the irradiation generated by the laser beam is variable temporarily by variation of a wavelength of the radiation maximum thereof.

6. The method as recited in claim 4 wherein the heating takes place by the infrared radiation and the infrared irradiation comprises a wavelength having a radiation maximum greater than 1250 nm in a second phase of the irradiation.

7. The method as recited in claim 1 wherein at least the neck portion of the preform is heated and/or irradiated on the outside thereof and on the inside thereof.

8. The method as recited in claim 1 wherein the heating includes a heating or irradiation from an inside of the preform, the heating or irradiation from the inside utilizing a further reflector disposed in the neck region.

9. The method as recited in claim 8 wherein the reflector distributes or deflects infrared or microwave irradiation employed for heating after piercing the neck region of the preform, a pierced neck region being at least partially transparent, the radiation impinging on the reflector and then being reflected to above and/or below the pierced neck region.

10. The method as recited in claim 1 wherein the threaded region and a support ring of the preform are not heated during the heating of the neck portion of the preform close to the threaded region.

11. The method as recited in claim 1 wherein the threaded region is cooled during the heating of the neck portion of the preform close to the threaded region.

12. A method of heating a preform of thermoplastic material prior to blow molding the same to form a container, with the preform being held at a threaded region during heating thereof, comprising:
heating a neck portion of the preform close to the threaded region; the heating of the neck portion close to the threaded region including a first phase and a second phase, during the second phase the heating of the neck portion close to the threaded region being at an increased intensity as compared to all of the other regions, the heating of the neck portion during the second phase occurring after a heating of the other regions during the first phase; and
directly following the second phase, blow molding the preform to form the container;
the heating of the neck portion close to the threaded region being at a lower intensity as compared to the other regions during the first phase of the heating;
wherein the heating includes utilizing a reflector formed by a paraboloidal mirror, and a glow filament disposed within the paraboloidal mirror,
wherein the reflector is fixedly disposed on a holder, and passes a heating path together with the preform to be heated,
wherein the holder is attached at a gripper for the preform.

13. The method as recited in claim 12 wherein the second phase is shortened as compared to the first phase.

14. The method as recited in claim 12 wherein the heating includes utilizing at least one of infrared irradiation, a laser beam, microwave irradiation and at least one open combustion flame.

15. The method as recited in claim 14 wherein the heating takes place by the infrared radiation and the infrared irradiation comprises a wavelength having a radiation maximum greater than 1250 nm in a second phase of the irradiation.

16. The method as recited in claim 12 wherein at least the neck portion of the preform is heated and/or irradiated on the outside thereof and on the inside thereof.

17. The method as recited in claim 12 wherein the heating includes a heating or irradiation from an inside of the preform, the heating or irradiation from the inside utilizing a further reflector disposed in the neck region.

18. The method as recited in claim 17 wherein the reflector distributes or deflects infrared or microwave irradiation employed for heating after piercing the neck region of the preform, a pierced neck region being at least partially transparent, the radiation impinging on the reflector and then being reflected to above and/or below the pierced neck region.

19. The method as recited in claim 1 wherein reflector areas can be formed in an adjustable manner with respect to their positions and/or surfaces.

20. The method as recited in claim 1 wherein the reflector is a reflective coating disposed on a glass tube, the glow filament disposed coaxially to the glass tube.

21. The method as recited in claim 20 wherein the glass tube includes an exit face, light from the glow filament exiting the exit face in a parallel manner.

22. The method as recited in claim 20 wherein the glass tube has an ellipse-shaped cross-section.

23. The method as recited in claim 1 wherein the paraboloidal mirror has an ellipse-shaped cross section.

* * * * *